US012609885B2

(12) United States Patent
Thubert et al.

(10) Patent No.: US 12,609,885 B2
(45) Date of Patent: Apr. 21, 2026

(54) HOT STANDBY FOR BORDER ROUTERS IN LOW-POWER AND LOSSY NETWORKS

(71) Applicant: Cisco Technology, Inc., San Jose, CA (US)

(72) Inventors: Pascal Thubert, Roquefort les Pins (FR); Patrick Wetterwald, Mouans Sartoux (FR); JP Vasseur, Saint Martin d'Uriage (FR); Eric Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 333 days.

(21) Appl. No.: 18/352,858

(22) Filed: Jul. 14, 2023

(65) Prior Publication Data

US 2025/0023811 A1     Jan. 16, 2025

(51) Int. Cl.
H04L 45/02          (2022.01)
H04L 47/70          (2022.01)

(52) U.S. Cl.
CPC .............. H04L 45/08 (2013.01); H04L 45/04 (2013.01); H04L 47/829 (2013.01)

(58) Field of Classification Search
None
See application file for complete search history.

(56) References Cited

U.S. PATENT DOCUMENTS

| | | | | |
|---|---|---|---|---|
| 8,750,100 B2 * | 6/2014 | Guo | | H04L 45/28 |
| | | | | 370/225 |
| 9,716,984 B2 * | 7/2017 | Purohit | | H04W 4/06 |
| 11,050,619 B1 * | 6/2021 | Zhao | | H04W 4/38 |
| 2013/0018993 A1 * | 1/2013 | Hui | | H04L 45/14 |
| | | | | 709/220 |
| 2014/0247726 A1 * | 9/2014 | Vasseur | | H04L 47/15 |
| | | | | 370/236 |

(Continued)

FOREIGN PATENT DOCUMENTS

| | | |
|---|---|---|
| DE | 202022101026 | 4/2022 |
| WO | 2019141970 | 7/2019 |

OTHER PUBLICATIONS

Ghaleb B., et al., "A Survey of Limitations and Enhancements of the IPv6 Routing Protocol for Low-power and Lossy Networks: A Focus on Core Operations", IEEE Communications Surveys Tutorials, Oct. 11, 2018, vol. 21, No. 2, 31 Pages.

*Primary Examiner* — Xavier S Wong
(74) *Attorney, Agent, or Firm* — Polsinelli P.C.

(57) ABSTRACT

A process can include determining respective link state information corresponding to a plurality of links between two or more border routers and a plurality of child nodes of the two or more border routers, the border routers and the child nodes included in a Destination Oriented Directed Acyclic Graph (DODAG) of a Low-Power Lossy Network (LLN). Consensus information indicative of a current status of each border router of the two or more border routers can be determined based on the respective link state information. The consensus information can be used to update an election of one or more active border routers from the two or more border routers to utilize as a virtual DODAG root for the LLN. Traffic directed to the virtual DODAG root can be routed to an active border router of the two or more border routers based on the updated election.

20 Claims, 5 Drawing Sheets

(56) References Cited

U.S. PATENT DOCUMENTS

| | | |
|---|---|---|
| 2015/0092560 A1 | 4/2015 | Hui et al. |
| 2016/0219414 A1 * | 7/2016 | Purohit .................. H04W 4/06 |
| 2017/0237669 A1 | 8/2017 | Hui et al. |
| 2019/0335479 A1 | 10/2019 | Thubert et al. |

* cited by examiner

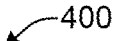

Determine respective link state information corresponding to each link of a plurality of links between two or more border routers and a plurality of child nodes of the two or more border routers, wherein the two or more border routers and the plurality of child nodes are included in a Destination Oriented Directed Acyclic Graph (DODAG) of a Low-Power Lossy Network (LLN)
402

↓

Determine consensus information indicative of a current status of each border router of the two or more border routers, wherein the consensus information is based on the respective link state information
404

↓

Based on the consensus information, update an election of one or more active border routers from the two or more border routers to utilize as a virtual DODAG root for the LLN
406

↓

Route traffic directed to the virtual DODAG root to an active border router of the two or more border routers based on the updated election
408

FIG. 4

HOT STANDBY FOR BORDER ROUTERS IN LOW-POWER AND LOSSY NETWORKS

TECHNICAL FIELD

The present technology pertains to wireless networks, and more particularly to systems and techniques for providing fallback for border routers implemented based on the IPV6 Routing Protocol for Low-Power and Lossy Networks (RPL).

BACKGROUND

Low-power and lossy networks (LLNs) are a class of network in which both routers and their interconnect are constrained. For example, LLN routers typically operate with constraints on one or more of processing power, memory, and/or energy (e.g., battery power). LLN interconnects often have high loss rates, low data rates, and may exhibit instability. For example, LLNs can be used to implement sensor networks, including Internet-of-Things (IoT) networks that may include many thousands of different IoT devices consuming wireless data and/or interacting with multiple different networked entities. LLNs may include tens of routers to thousands of routers. Supported traffic flows in an LLN include point-to-point (e.g., between devices inside the LLN), point-to-multipoint (e.g., from a central control point to a subset of devices inside the LLN), and multipoint-to-point (e.g., from devices inside the LLN towards a central control point).

The IPV6 Routing Protocol for Low-Power and Lossy Networks (Routing Protocol for LLNs, or RPL) specifies mechanisms for supporting multipoint-to-point traffic from devices inside the LLN towards a central control point, and for supporting point-to-multipoint traffic from the central control point to the devices inside the LLN. RPL is a distance vector routing protocol that builds a Destination Oriented Directed Acyclic Graph (DODAG) in addition to a set of features to bound the control traffic, support local (and slow) repair, etc. The RPL architecture provides a flexible method by which each node performs DODAG discovery, construction, and maintenance.

The LLN Border Router (LBR) or DAG root typically represents the bottleneck in an LLN network. For instance, the LBR may be both a communication bottleneck (e.g., where a vast majority of traffic flows through the LBR) as well as a memory bottleneck (e.g., storing per-0node state information for each node in the LLN). Additionally, the effect of LBR failures on an LLN can be particularly problematic to mitigate, particularly since the RPL routing protocol specifies that all of the nodes within the LLN of the failed LBR must migrate to a new LLN and associated LBR. LBR failures may be relatively common occurrences in LLNs. LLNs may face communication challenges relating to, for example, communication over a physical medium that is strongly affected by environmental conditions that change over time. Examples include, but are not limited to, temporal changes in interference (e.g., other wireless networks or electrical appliances), physical obstruction (e.g., doors opening or closing, seasonal changes in foliage density of trees), and propagation characteristics of the physical media (e.g., temperature or humidity changes). The time scales of such temporal changes can range between milliseconds (e.g., transmissions from other transceivers) to months (e.g., seasonal changes of outdoor environment).

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are therefore not to be considered to be limiting of its scope, the principles herein are described and explained with additional specificity and detail through the use of the accompanying drawings in which:

FIG. 4 is a flow diagram illustrating an example process for wireless communication using a virtual DODAG root in an LLN, according to some aspects of the present disclosure.

DETAILED DESCRIPTION

Figure 1:
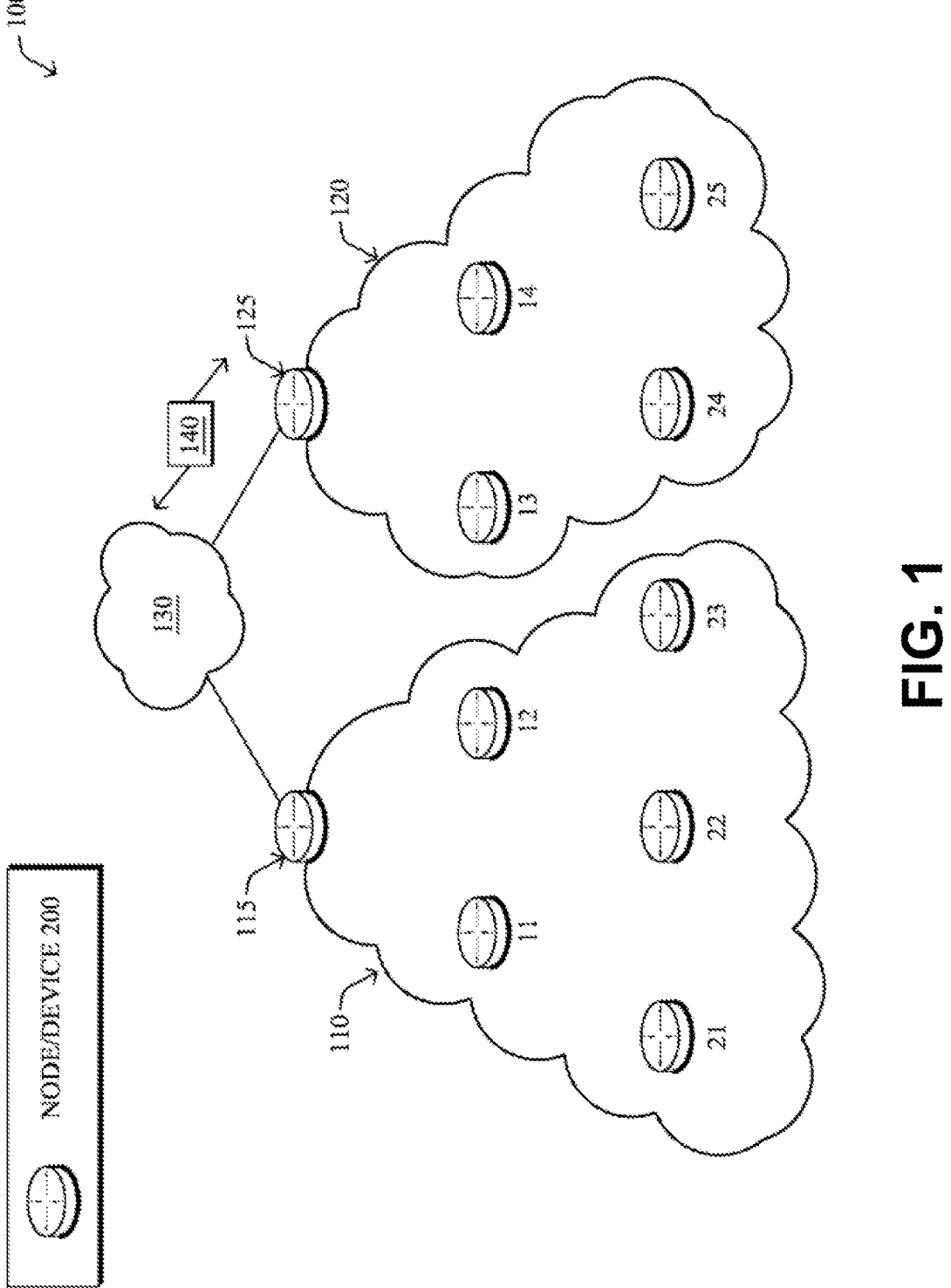
FIG. 1 illustrates an example computer network, according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Disclosed are systems, apparatuses, methods, and computer-readable media for wireless communications. In one illustrative example, a method is providing, the method comprising: determining respective link state information corresponding to each link of a plurality of links between two or more border routers and a plurality of child nodes of the two or more border routers, wherein the two or more border routers and the plurality of child nodes are included in a Destination Oriented Directed Acyclic Graph (DODAG) of a Low-Power Lossy Network (LLN); determining consensus information indicative of a current status of each border router of the two or more border routers, wherein the consensus information is based on the respective link state information; based on the consensus information, updating an election of one or more active border routers from the two or more border routers to utilize as a virtual DODAG root for the LLN; and routing traffic directed to the virtual DODAG root to an active border router of the two or more border routers based on the updated election.

In some aspects, the two or more border routers are LLN border routers (LBRs), each LBR configured as a root node of the DODAG and linked to one or more of the plurality of child nodes; and the virtual DODAG root includes the two or more LBRs.

In some aspects, the method further includes: instantiating a virtual rank corresponding to the virtual DODAG root, wherein the virtual rank is different from a respective rank corresponding to each LBR of the two or more LBRs; and advertising, by the plurality of child nodes, the virtual rank of the virtual DODAG root to a plurality of additional nodes of the DODAG, without advertising the respective rank corresponding to each LBR of the two or more LBRs.

In some aspects, the traffic directed to the virtual DODAG root is received from an additional node that is below the plurality of child nodes in the DODAG, and wherein the traffic is addressed to a virtual rank corresponding to the virtual DODAG root.

In some aspects, the plurality of child nodes includes a plurality of sentinel nodes of the DODAG; and each sentinel node of the plurality of sentinel nodes is configured to monitor a DODAG root status based on synchronization of respective local information determined by each sentinel node.

In some aspects, determining the respective link state information includes determining the respective local information by each sentinel node; and the synchronization of the respective local information determined by each sentinel node is based on consensus message passing between the plurality of sentinel nodes.

In some aspects the consensus information is indicative of a failure of at least one active border router included in the virtual DODAG root, and wherein the consensus information is determined based on message passing between the plurality of sentinel nodes of the respective local information.

In some aspects, the method further includes reconfiguring, based on detecting the failure, a traffic routing pattern between the plurality of sentinel nodes and the virtual DODAG root.

In some aspects, the traffic routing pattern is updated to exclude the failed border router from the election of active border routers within the virtual DODAG root.

In some aspects, the two or more border routers include two or more LBRs within the virtual DODAG root, and wherein the plurality of child nodes includes a plurality of sentinel nodes of the DODAG; and the consensus information is indicative of a consensus current traffic load determined for each respective LBR of the two or more LBRs within the virtual DODAG root.

In some aspects, the method further includes performing load balancing of traffic originating within the DODAG and addressed to the virtual DODAG root, wherein the load balancing is based on the consensus current traffic load determined for the two or more LBRs within the virtual DODAG root.

In some aspects, a first portion of the traffic addressed to the virtual DODAG root is tunneled from a sentinel node of the plurality of sentinel nodes to a first LBR within the virtual DODAG root; and a second portion of the traffic addressed to the virtual DODAG root is tunneled from a sentinel node of the plurality of sentinel nodes to a second LBR within the virtual DODAG root.

In another illustrative example, a system is provided, the system including: one or more processors; and one or more computer-readable storage media having computer-readable instructions stored thereon, wherein the computer-readable instructions, when executed by the one or more processors, cause the one or more processors to: determine respective link state information corresponding to each link of a plurality of links between two or more border routers and a plurality of child nodes of the two or more border routers, wherein the two or more border routers and the plurality of child nodes are included in a Destination Oriented Directed Acyclic Graph (DODAG) of a Low-Power Lossy Network (LLN); determine consensus information indicative of a current status of each border router of the two or more border routers, wherein the consensus information is based on the respective link state information; based on the consensus information, update an election of one or more active border routers from the two or more border routers to utilize as a virtual DODAG root for the LLN; and route traffic directed to the virtual DODAG root to an active border router of the two or more border routers based on the updated election.

In some aspects, the two or more border routers are LLN border routers (LBRs) included within the virtual DODAG root, each LBR configured as a root node of the DODAG and linked to one or more of the plurality of child nodes, and wherein the computer-readable instructions further cause the one or more processors to: instantiate a virtual rank corresponding to the virtual DODAG root, wherein the virtual rank is different from a respective rank corresponding to each LBR of the two or more LBRs; and advertise, by the plurality of child nodes, the virtual rank of the virtual DODAG root to a plurality of additional nodes of the DODAG, without advertising the respective rank corresponding to each LBR of the two or more LBRs.

In some aspects, the plurality of child nodes includes a plurality of sentinel nodes of the DODAG; and each sentinel node of the plurality of sentinel nodes is configured to monitor a DODAG root status based on synchronization of respective local information determined by each sentinel node.

In some aspects, the consensus information is indicative of a failure of at least one active border router included in the virtual DODAG root, and wherein the consensus information is determined based on message passing between the plurality of sentinel nodes of the respective local information.

In some aspects, the computer-readable instructions cause the one or more processors to: reconfigure a traffic routing pattern between the plurality of sentinel nodes and the virtual DODAG root based on detecting the failure, wherein the traffic routing pattern is updated to exclude the failed border router from the election of active border routers within the virtual DODAG root.

In some aspects, the computer-readable instructions further cause the one or more processors to: perform load balancing of traffic originating within the DODAG and addressed to the virtual DODAG root, based on a consensus current traffic load determined for the two or more LBRs within the virtual DODAG root using a plurality of sentinel nodes of the DODAG.

In some aspects, a first portion of the traffic addressed to the virtual DODAG root is tunneled from a sentinel node of the plurality of sentinel nodes to a first LBR within the virtual DODAG root; and a second portion of the traffic addressed to the virtual DODAG root is tunneled from a sentinel node of the plurality of sentinel nodes to a second LBR within the virtual DODAG root In another illustrative example, provided are one or more non-transitory computer-readable media including computer-readable instructions, which when executed by one or more processors, cause the one or more processors to: determine respective link state information corresponding to each link of a plurality of links between two or more border routers and a plurality of child nodes of the two or more border routers, wherein the two or more border routers and the plurality of child nodes are included in a Destination Oriented Directed Acyclic Graph (DODAG) of a Low-Power Lossy Network (LLN); determine consensus information indicative of a current status of each border router of the two or more border routers, wherein the consensus information is based on the respective link state information; based on the consensus information, update an election of one or more active border routers from the two or more border routers to utilize as a virtual DODAG root for the LLN; and route traffic directed to the virtual DODAG root to an active border router of the two or more border routers based on the updated election.

Example Embodiments

Wireless Smart Ubiquitous (Wi-SUN) networks are implemented based on the IPV6 Routing Protocol for Low-Power and Lossy Networks (e.g., RPL, or alternatively "Routing Protocol for LLNs"). Wireless Smart Ubiquitous (Wi-SUN) networks can be used for large scale deployments of Internet-of-Things (IoT) IoT nodes and devices. For instance, Wi-SUN enables utilities, municipalities, and other enterprises to deploy long-range, low-power wireless mesh networks to connect thousands of IoT nodes. In other examples, Wi-SUN networks can be used in smart metering, substation automation, smart city networks (e.g., Field Area Networks (FANs)), etc.

RPL works by creating a network topology similar to a tree, such as a directed acyclic graph (DAG), where nodes within the network topology have an assigned rank value that increases with distance to the root node of the tree. In particular, RPL is a routing protocol that organizes nodes along a Destination Oriented Directed Acyclic Graph (DODAG), rooted at a node referred to as the DODAG root. In the DODAG topology used by RPL, all paths terminate at the DODAG root (i.e., communications between any nodes must pass through the DODAG root).

In some aspects, using RPL in a Wi-SUN network is based on building a DODAG rooted at a specific node referred to as the LBR (LLN Border Router). The LBR node has more capacity than a regular node and is usually connected to the infrastructure (e.g., the LBR usually connects the DODA/Wi-SUN network to another network, such as the internet). All the paths of the DODAG terminate at the LBR. The LBR is often the most critical node of LLNs and other RPL-based networks. For a number of reasons, the LBR or DAG root typically represents the network's bottleneck, both in terms of a communication bottleneck and a memory bottleneck.

1) Communication bottleneck-One typical property of LLN applications (e.g., AMI) is that traffic flows typically traverse the LBR. In particular, the vast majority of traffic within a LLN either flows from the LBR to a LLN device or from an LLN device to an LBR. Another typical property of LLN applications is that the vast majority of devices generate some amount of constant-rate traffic through the LBR. Such traffic includes control-plane traffic (e.g., periodic DAO messages in RPL to report DODAG parents) and data-plane traffic (e.g., periodic meter reads sent to a collection engine). The amount of constant-rate traffic that the LBR/root experiences typically grows linearly with the number of nodes.

2) Memory bottleneck—The LBR must generally maintain a per-node state for each node in its network. Such state includes maintaining the routing topology (e.g., RPL DODAGs) and security state (e.g., IEEE 802.1x Pairwise Master Key and IEEE 802.11 Pairwise Temporal Keys and Replay Counters).

Quickly detecting that a specific LBR functionality is degraded, down, or otherwise no longer able to meet its objectives is critical to the stability and reliability of the RPL-based Wi-SUN network-failure of the LBR means that all of the nodes in the DODAG are cut off from communicating over the Wi-SUN network (because all communications within the DODAG, to the DODAG, and from the DODAG must pass through the LBR).

Some aspects of this problem are addressed in the IETF Internet Draft entitled "RNFD: Fast border router crash detection in RPL" <draft-ietf-roll-rnfd-01> by Iwanicki (Oct. 12, 2022 version). However, this IETF Internet Draft is limited to detecting a crash of an LBR (e.g., LBR failure) only, and does not address degraded state detection or the fallback to another node as DODAG root without being triggered by detecting a crash of an LBR. More particularly, in existing approaches to implementing RPL and RPL-based networks (e.g., including Wi-SUN and/or other LLNs), detection of an LBR failure triggers disbanding of the current DODAG and forces the formation (or reformation) of the DODAG using a new LBR, which can be a complex and time-consuming process.

As noted previously, the correct operation of an RPL network typically requires border routers to be up, as it is a design principle of RPL (adopted to minimize node resource consumption) that much of the responsibility for routing within or for the LLN is delegated to LBRs. Accordingly, when an LBR crashes (e.g., when an LBR failure occurs), all of the nodes in the DODAG for which the LBR acts as the DODAG root lose the ability to communicate with other Internet hosts. Moreover, a significant portion of the DODAG paths interconnecting the nodes will become invalid as well, as most interconnect paths route through the LBR. Remaining DODAG paths degenerate as a result of DODAG repair attempts, which are bound to fail in the event of an LBR crash or failure. As such, LBR failure prevents the nodes within the DODAG to communicate with other Internet hosts and effectively renders routing inside the DODAG to be largely impossible.

Accordingly, there is a need for systems and techniques that can be used to quickly detect that a specific LBR functionality is degraded, down, and/or otherwise unable to currently meet one or more pre-determined objectives. For instance, just as a failed LBR functionality results in failed functionality for the nodes within the LBR's DODAG, so too does a degraded LBR functionality result in a correspondingly degraded functionality for the nodes within the LBR's DODAG. There is also a further need for systems and techniques that can be used to provide hot standby LBRs for fallback in the event of an LBR failure or degradation, without requiring formation (or reformation) of the DODAG using the new LBR, as such systems and techniques would thereby improve the stability and reliability of the LLN or RPL-based network.

The present technology includes systems, methods, and computer-readable media (also referred to as "systems and techniques") for solving these problems and discrepancies.

A computer network is a geographically distributed collection of nodes/devices interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical light paths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices/nodes such as sensors, etc., that cooperatively monitor physical or environmental conditions at different locations, such as, e.g., energy/power consumption, resource consumption (e.g., water/gas/etc. for advanced metering infrastructure or "AMI" applications), temperature, pressure, vibration, sound, radiation, motion, pollutants, etc. Other types of smart objects include actuators, which may include functionality for turning on/off an engine or performing any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, 11-14 and 21-25, and described in more detail below) interconnected by various methods of communication. For instance, the communication links between devices 200 may be shared media (e.g., wireless links, PLC links, etc.), where certain devices 200, such as, e.g., routers, sensors, computers, etc., may be in communication with other devices 200, e.g., based on distance, signal strength, current operational status, location, etc. Other devices 200, such as ingress routers 115 and 125, may provide access for particular routing domains, 110 and 120, respectively, which may be directly interconnected, or else connected via a network 130 (e.g., a WAN or LAN) as shown.

Those skilled in the art will understand that any number of nodes/devices, communication links, etc. may be used in the computer network 100, and that the view shown herein is for simplicity. Also, those skilled in the art will understand that while nodes/devices 115 and 125 are referred to as "ingress routers," their functionality can provide connectivity into and out of the routing domains.

Data packets 140 (e.g., traffic and/or messages sent between the devices/nodes 200) may be exchanged among the nodes/devices 200 of the computer network 100 using predefined network communication protocols such as certain known wired or wireless protocols (e.g., IEEE Std. 802.15.4 (or 15.4g), WiFi, Bluetooth®, etc.) or other shared media protocols where appropriate (e.g., PLC). In this context, a protocol includes a set of rules defining how the nodes interact with each other.

Figure 2:
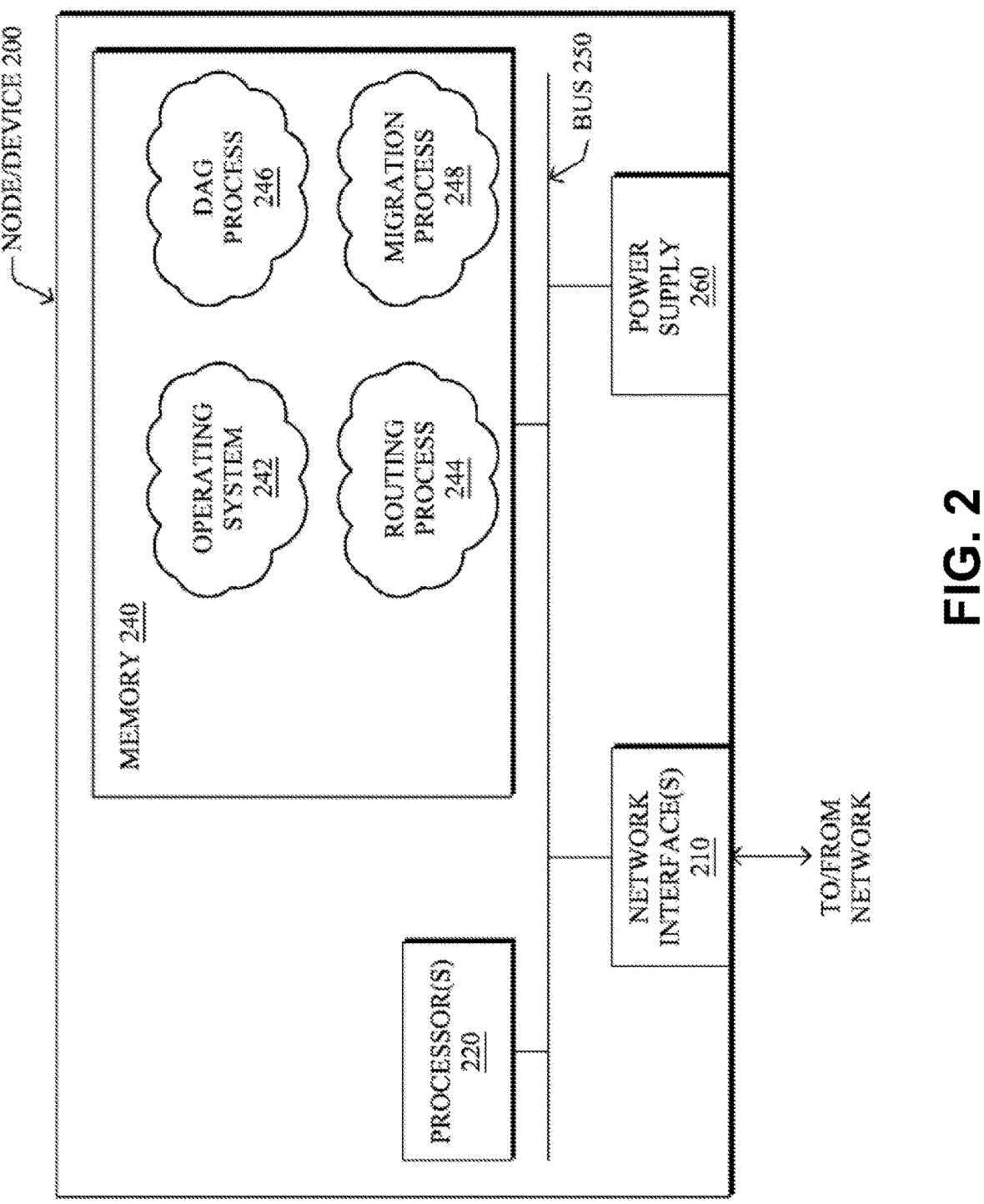
FIG. 2 illustrates an example network device/node, according to some aspects of the present disclosure.

FIG. 2 is a schematic block diagram of an example device 200 that may be used with one or more embodiments described herein, e.g., as a node/device 11-14 or 21-25 and/or an ingress router 115/125. The device 200 may comprise one or more network interfaces 210, at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links coupled to the network 100 (e.g., wired, wirelessly, via PLC, etc.). The network interfaces 210 may be configured to transmit and/or receive data using one or more different communication protocols, particularly depending upon the underlying transmission medium (e.g., wireless, PLC, wired, etc.). Note, further, that a device 200 may have one or more different types of network connections 210, namely, wireless and wired/physical connections, and that the view herein is merely for illustration. For example, the ingress routers 115/125, such as field area routers (FARs), may comprise a wired connection to network 130, and a wireless connection to the devices 11-14 and 21-25 within the domain. Also, while the network interface 210 is shown separately from power supply 260, in certain embodiments (e.g., PLC) the network interface 210 may communicate through the power supply 260, or may be an integral component of the power supply 260. In some specific configurations the PLC signal may be coupled to the power line feeding into the power supply 260.

The memory 240 comprises a plurality of storage locations that are addressable by the processor 220 and the network interface(s) 210 for storing software programs and data structures associated with the embodiments described herein. The processor 220 may comprise necessary elements or logic adapted to execute the software programs and manipulate the data structures. An operating system 242, portions of which are typically resident in memory 240 and executed by the processor 220, functionally organizes the device by, inter alia, invoking operations in support of software processes and/or services executing on the device 200. For instance, these software processes and/or services may comprise routing process/services 244, which may include a directed acyclic graph (DAG) process 246 in certain embodiments, and also an illustrative routing domain migration process 248 as described herein, among other things. Note that while routing domain migration process 248 is shown in centralized memory 240, alternative embodiments provide for the process 248 to be specifically operated within the network interfaces 210, such as a component of a MAC layer.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPV6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL may generally be described as a distance vector routing protocol that builds a Directed Acyclic Graph (DAG) for use in routing traffic/packets, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks"<draft-ietf-roll-routing-metrics-19> by Vasseur, et al. (Mar. 1, 2011 version). Further, an example OF (e.g., a default OF) may be found in an IETF Internet Draft, entitled "RPL Objective Function 0" <draft-ietf-roll-of0-11> by Thubert (May 5, 2011 version) and "The Minimum Rank Objective Function with Hysteresis"<draft-ietf-roll-min-rank-hysteresis-of-03> by O. Gnawali et al. (May 3, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

As mentioned previously, the systems and techniques described herein can be used to provide a virtual DODAG root comprising a plurality of LBRs for hot standby and/or fallback activation based on detecting an LBR failure and/or functionality degradation for a currently active LBR of the virtual DODAG root. In some embodiments, a plurality of sentinel nodes can be provided as the child nodes of the virtual DODAG root (e.g., each sentinel node is a child node of at least one of the root LBRs included in the virtual DODAG root).

In some aspects, the sentinel nodes can monitor the virtual DODAG root in order to quickly detect or otherwise determine if a specific LBR functionality has degraded or failed, and/or if a particular LBR within the virtual DODAG root has failed. In some cases, the sentinel nodes can be used to implement and/or control a monitoring and control mechanism based on Hot Standby Router Protocol (HSRP) and/or Virtual Router Protocol (VRP), among various others. The sentinel nodes can, in addition to detecting an LBR failure within the virtual DODAG root, be configured to detect the capability for an LBR and/or the virtual DODAG root to meet one or more service level agreement (SLA) requirements of the nodes attached to the LBR and/or the virtual DODAG root.

The sentinel nodes can be chosen, elected, or selected (e.g., by configuration, consensus or election amongst or within the LLN or DODAG, etc.) to be the nodes that are used to monitor the LBR activity for the DODAG. In one illustrative example, the sentinel nodes can be configured to perform detection of LBR failures, functionality degradation, traffic load, etc. within the virtual DODAG root. For instance, the sentinel nodes can perform this detection based on solving a byzantine generals problem of deciding or assessing the current quality of each LBR DAG root within the virtual DODAG root (e.g., assessing how good each LBR DAG root is within the virtual DODAG root). In general, the sentinel node approach of the byzantine generals problem can be understood as a consensus-based mechanism, wherein messaging is exchanged between the plurality of sentinel nodes indicative of the perceived status of each LBR DAG root within the virtual DODAG root, as it is perceived by each respective sentinel of the plurality of sentinel nodes. Based on a consensus determination of the current status or state of each LBR within the virtual DODAG root, the sentinels can perform an additional consensus determination to select which LBR (of those that are consensus-determined to be currently active) will be used as the active DAG root of the virtual DODAG root.

Notably, when a detection is made by the sentinel nodes that an LBR failure or SLA functionality degradation has occurred for the virtual DODAG root/a currently active LBR within the virtual DODAG root, the issue can be remediated without requiring the current DODAG be disbanded and reformed as would be the case according to a conventional implementation of the RPL routing protocol. Rather, the systems and techniques described herein can perform hot standby fallback based on using the sentinel nodes to elect another DAG root within the virtual DODAG root to become the new LBR (or new LBRs, if multiple DAG roots are elected), and subsequently tunneling the DODAG traffic to the newly elected DAG root(s) without changing the advertised rank to the child nodes of the virtual DODAG root. Advantageously, this allows the virtual DODAG root to remain available for the data traffic of the LLN/DODAG, without requiring the reforming of a new DODAG.

As discussed previously, the RPL routing protocol for LLNs organizes networks into DODAGs, where each DODAG corresponds to a particular LBR, as all paths of the DODAG terminate at its corresponding LBR. Every node within a DODAG is dynamically assigned a rank that is representative of its distance (measured in some metric) to the LBR having the minimal rank, where the LBR having the minimal rank is the DODAG root.

The assigned ranks allows each non-LBR node to select from amongst its neighboring nodes (e.g., the nodes to which the node has links) those that are closer to the LBR than the node itself. The resulting DODAG paths consist of node-parent links and are used for routing packets upward, to the LBR and outside of the LLN. The DODAG paths are also used by the nodes to periodically report their respective connectivity information upward to the LBR, which in turn permits the routing of packets downward from the LBR to particular non-LBR nodes within the LLN.

That is, the LBR (i.e., DODAG or DAG root) can represent a single point of failure in a conventional RPL-based network, as the LBR or DODAG root node is responsible for routing within the LLN and also for driving the process of DODAG construction and maintenance underlying the RPL protocol. The systems and techniques described herein can provide improved reliability for LLNs, based on implementing a virtual DODAG root that includes multiple LBR-capable nodes that are advertised downward to the non-LBR nodes using a single, virtual rank. The use of a single, virtual rank for the advertisement of the plurality of LBR-capable DAG root nodes hides any churn between the effective LBR of the virtual DODAG root.

Figure 3:
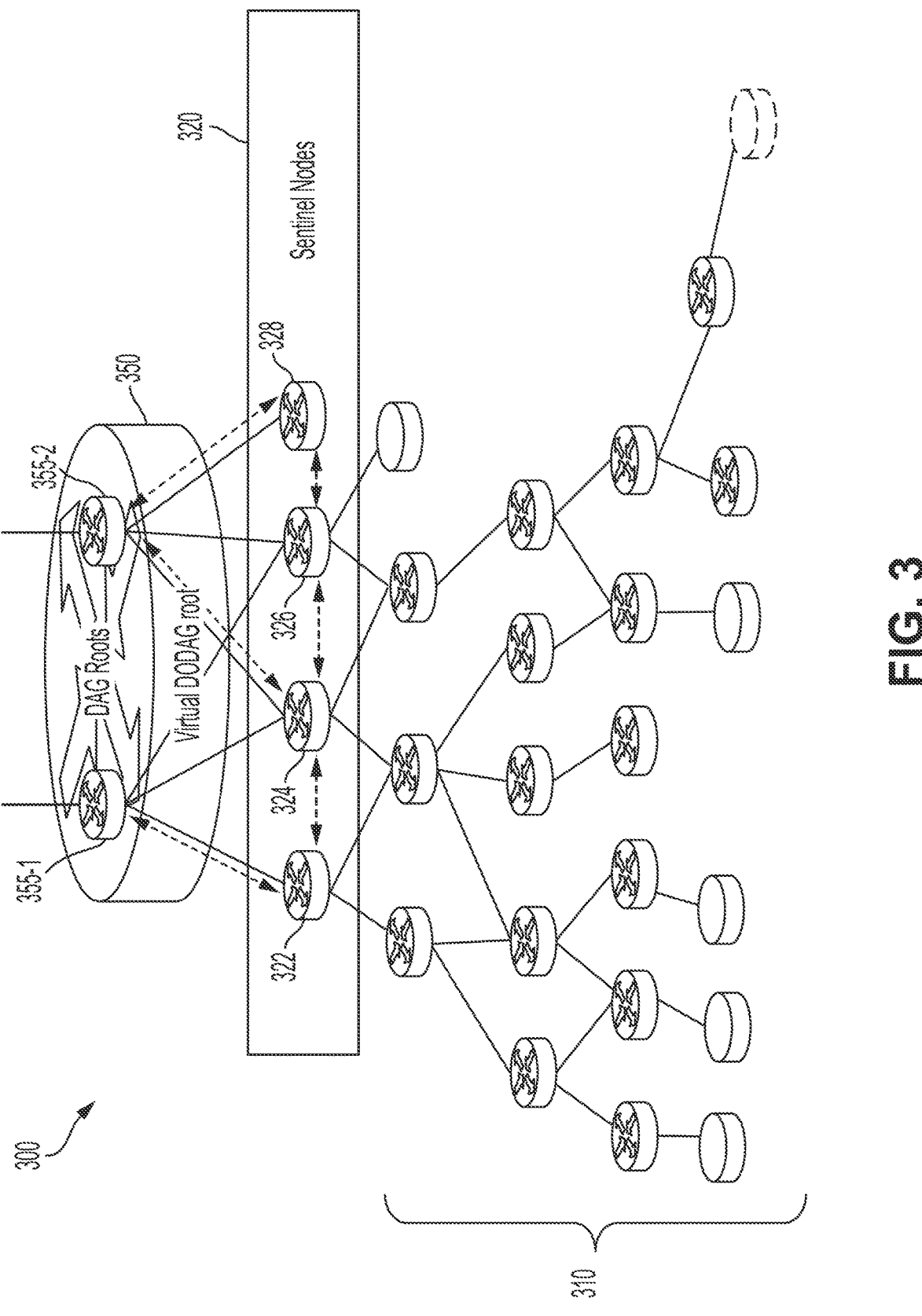
FIG. 3 is a diagram illustrating an example computer network with a Destination Oriented Directed Acyclic Graph (DODAG) topology that includes a virtual DODAG root comprising a plurality of low-power and lossy network (LLN) border routers (LBRs), according to some aspects of the present disclosure.

For example, FIG. 3 is a diagram illustrating an example computer network with a Destination Oriented Directed Acyclic Graph (DODAG) topology 300 that includes a virtual DODAG root 350, in accordance with some examples. The virtual DODAG root 350 includes multiple DAG roots, shown here as the example DAG roots 355-1 and 355-2, although it is noted that in at least some embodiments, a greater or lesser number of DAG roots can be included in the virtual DODAG root 350 without departing from the scope of the present disclosure. As used herein, the DAG roots 355-1, 355-2 can interchangeably referred to as LBRs or LBR-capable nodes. In other words, it is contemplated that the virtual DODAG root 350 can include a plurality of nodes, of which at least one or more nodes are active as an LBR at any given time.

In some embodiments, the virtual DODAG root 350 can include a plurality of 6LoWPAN border routers (6LBRs). For instance, one or more of the LBR-capable nodes 355-1 and 355-2 can be implemented as a 6LBR node. 6LoWPAN is an IPV6 protocol, and more specifically refers to IPV6 over Low-power Wireless Personal Area Networks. In some aspects, one or more of the LBR-capable nodes 355-1 and 355-2 can be used to implement the RPL routing protocol. In some embodiments, some (or all) of the LBR-capable nodes within virtual DODAG root 350 (e.g., 355-1, 355-2, etc.) can be both a 6LBR-capable node and an RPL LBR-capable node. As used herein, the term "LBR" or "LBR-capable" node is used to refer interchangeably to a border router that is operable with the DODAG topology 300, according to one or more various protocols, which include but are not limited to, RPL, 6LoWPAN, etc.

In addition to virtual DODAG root 350, the DODAG topology 300 further includes a plurality of sentinel nodes 320. For instance, the plurality of sentinel nodes 320 is shown in the example of FIG. 3 as including a first sentinel node 322, a second sentinel node 324, a third sentinel node 326, and a fourth sentinel node 328. As used herein, a "sentinel node" may also be referred to as a "sentinel." Additionally, the plurality of sentinel nodes 320 may be interchangeably referred to as a "sentinel layer" or "the sentinels."

The sentinel role is a role that can be assigned to a given node within the LLN (e.g., a given node within DODAG 300). A sentinel node is a neighboring node of the DODAG root, i.e., the immediate child node of the DODAG root. In the context of FIG. 3, the sentinel nodes 320 are the immediate child nodes of the virtual DODAG root 350 (e.g., the immediate child nodes of at least one of the LBR-capable nodes 355-1, 355-2 that are included in the virtual DODAG root 350). The sentinel nodes 320 can be used to monitor the status of the virtual DODAG root 300, as will be described in greater detail below. It is noted that a greater or lesser quantity of sentinel nodes than the four sentinels 322-328 depicted in FIG. 3 can be included in the sentinel layer 320, without departing from the scope of the present disclosure. Additionally, being an immediate neighbor/child node of the virtual DODAG root 300 does not necessarily imply that a node must be a sentinel node. For instance, in at least some embodiments, the sentinel layer 320 may include only a portion or subset of the immediate child nodes of the LBR-capable nodes (e.g., 355-1, 355-2) within virtual DODAG root 350 (e.g., LBR-capable nodes 355-1 and 355-2 can include additional child nodes in DODAG 300 that are not shown).

Below the sentinel layer 320 of DODAG 300 are a plurality of non-LBR nodes 310. Recalling that all paths terminate at the root of DODAG 300, the non-LBR nodes 310 communicate via the virtual DODAG root 350 (e.g., via one of the LBR-capable nodes 355-1, 355-2 included in the virtual DODAG root 350). In some aspects, the non-LBR nodes 310 may be referred to as acceptor nodes (e.g., a node of the DODAG that is not a DAG root/LBR-capable node, and that is not a sentinel). In some embodiments, the DODAG topology 300 includes a plurality of nodes that can be divided into a first group comprising the two or more LBR-capable nodes within the virtual DODAG root 350, a second group comprising the plurality of sentinel nodes 320, and a third group comprising the plurality of acceptor nodes 310.

The plurality of sentinel nodes 320 can be used to detect a crash or failure of an LBR node within virtual DODAG 350 and/or that an LBR node within virtual DODAG 350 has degraded in performance or is otherwise no longer able to meet one or more SLA requirements associated with nodes attached to it. The detection performed by the sentinel nodes 320 can be based on a consensus message passing mechanism implemented between the plurality of sentinel nodes 320 (and optionally, further including one or more of the DAG root nodes/LBRs within virtual DODAG root 350). The consensus message passing mechanism will be described in greater depth below.

The plurality of sentinel nodes 320 can additionally be used to implement the virtual DODAG root 350 based on advertising downward (e.g., to the plurality of nodes 310) a single virtual rank corresponding to the virtual DODAG root 350. By advertising the virtual rank downward, the plurality of sentinel nodes mask or hide the existence of the multiple DODAG roots/LBRs that are included in the virtual DODAG root 350—the acceptor nodes 350 perceive a single root and calculate a single distance from themselves to the single root (e.g., virtual DODAG root 350). In other words, the plurality of sentinel nodes 320 collectively have links among the various sentinel nodes 322-328 and links from the sentinels to each LBR node 355-1, 355-2 within virtual DODAG root 350. However, the existence of the multiple LBR nodes 355-1, 355-2 is not propagated downward below or beyond the sentinel layer 320—below the sentinel layer 320, only the single virtual DODAG root node 350 is advertised with its corresponding virtual rank. Accordingly, the plurality of sentinel nodes 320 can implement a translation layer between the multiple LBR nodes of the virtual DODAG root 350 and the plurality of acceptor nodes 310.

In one illustrative example, the plurality of sentinel nodes 320 can utilize the features described above to implement hot standby activation, fallback, and/or load-balancing between the alternate possible LBRs 355-1, 355-2, etc., that are configured within virtual DODAG root 350. For instance, the sentinel layer 320 can use the consensus message passing mechanism to determine a consensus state or condition of the LBRs 355-1, 355-2 within virtual DODAG root 350. The consensus mechanism can further be used to determine an election of one or more LBRs within virtual DODAG root 350 that are to be used as the active/current root node. The sentinel layer 320 can subsequently use the downward advertisement of the single virtual rank corresponding to the virtual DODAG root 350 to hide the churn between the sentinels and the effective roots, e.g., as the sentinels perform election of effective roots based on detecting failures, degraded functionality, un-met SLA requirements, and/or based on load balancing criteria.

In some embodiments, each sentinel node 322-328 of the plurality of sentinels 320 is communicatively linked to at least one of the LBRs 355-1, 355-2. More generally, each sentinel node has a link to at least one LBR (of the two or more LBRs) included in virtual DODAG root 350. Collectively, the plurality of sentinels 320 are linked to each LBR of the two or more LBRs within virtual DODAG root 350.

The links between the sentinels and LBRs within the virtual DODAG root can be communication links that are included in the DODAG topology 300. For instance, the links shown with solid lines in FIG. 3 represent in-band communication links of DODAG topology 300. Links shown with dashed lines in FIG. 3 can represent out-of-band communications relative to the DODAG topology, and may be used for the consensus message passing mechanism between the plurality of sentinel nodes 320, as will be described in greater depth below.

Each of the sentinel nodes 322-328 can be configured to monitor the current condition of each LBR/DAG root instance to which it is linked. For instance, sentinel node 322 is linked to and monitors the first DAG root instance 355-1. Sentinel node 324 is linked to and monitors the first DAG root instance 355-1 and the second DAG root instance 355-2. Sentinel node 326 is linked to and monitors the first DAG root instance 355-1 and the second DAG root instance 355-2. Sentinel node 328 is linked to and monitors the second DAG root instance 355-2.

In some aspects, the sentinel nodes monitor the condition of the DAG root instances/LBRs within virtual DODAG root 350 based on tracking the status of the respective links to the sentinel layer 320 (e.g., whether the link is up or down, whether the link is functioning normally or with degraded performance, the current load on the link, etc.). Each sentinel node 322-328 determines its perceived state information of its connected DAG root instances (e.g., either DAG root instance 355-1 and/or 355-2), and subsequently synchronizes its local knowledge with that of the other sentinel nodes. The synchronization of local knowledge between the sentinel layer 320 can be performed based on the consensus message passing mechanism noted above. In some aspects, message passing for synchronization of local knowledge between the sentinel layer 320 can be performed in-band using one or more RPL messages (e.g., such as a DIO [DODAG Information Object] or a DIS [DODAG Information Solicitation]). Message passing between the sentinel layer 320 can additionally, or alternatively, be performed out-of-band with the DODAG topology 300, as noted previously above.

The plurality of sentinel nodes 320 can detect an LBR failure (e.g., a failure of LBR node 355-1 or 355-2) and can also detect the capability for any given LBR (e.g., LBR 355-1, 355-2) to meet the SLA requirements of the nodes attached to it. In some embodiments, this detection can also be done by the access router, in addition to or combination with the sentinels. In one illustrative example, the plurality of sentinel nodes 320 can perform LBR state and/or load detection For instance, the sentinel nodes 322-328 can monitor the virtual DODAG root 350 in order to quickly detect or otherwise determine if a specific LBR functionality has degraded or failed for either of LBR 355-1 or LBR 355-2, and/or if a particular one of the LBRs within the virtual DODAG root 350 (e.g., LBR 355-1, LBR 355-2) has failed. In some cases, the sentinel nodes 320 can be used to implement and/or control a monitoring and control mechanism based on Hot Standby Router Protocol (HSRP) and/or Virtual Router Protocol (VRP), among various others. The sentinel nodes 320 can, in addition to detecting an LBR failure within the virtual DODAG root 350, be configured to detect the capability for an LBR and/or the virtual DODAG root to meet one or more service level agreement (SLA) requirements of the nodes attached to the LBR (e.g., LBR 355-1 or LBR 355-2) and/or the virtual DODAG root 350.

The sentinel nodes 320 can be chosen, elected, or selected (e.g., by configuration, consensus or election amongst or within the LLN or DODAG 300, etc.) to be the nodes that are used to monitor the LBR activity for the DODAG topology 300. In one illustrative example, the sentinel nodes 320 can be configured to perform detection of LBR failures, functionality degradation, traffic load, etc., within the virtual DODAG root 350. For instance, the sentinel nodes 320 can perform this detection based on solving a byzantine generals problem of deciding or assessing the current quality of each LBR DAG root instance 355-1, 355-2, etc., within the virtual DODAG root 350 (e.g., assessing the state and/or quality of links to LBR DAG root instance 355-1, and assessing the state and/or quality of links to LBR DAG root instance 355-2, etc.). In general, the sentinel node approach of the byzantine generals problem can be understood as a consensus-based mechanism, wherein messaging is exchanged between the plurality of sentinel nodes 320 indicative of the local knowledge or perceived status of each LBR DAG root 355-1, 355-2 within the virtual DODAG root 350 (e.g., as it is perceived by each respective sentinel 322-328 of the plurality of sentinel nodes 320).

Based on the synchronization of local knowledge across the sentinel layer 320, using the consensus message passing mechanism, the sentinels can determine a consensus knowledge or consensus view of the current state of the LBR DAG root instances within the virtual DODAG root (e.g., a consensus knowledge/view of the current state of LBR DAG root instances 355-1 and 355-2, and/or of virtual DODAG root 350 as a whole). The consensus for a particular LBR DAG root instance can be based on a majority or most commonly present state condition that is determined locally by the respective sentinels linked to the particular LBR DAG root instance.

For instance, the consensus state information for first LBR DAG root instance 355-1 can be based on the local knowledge determined and shared by sentinel nodes 322, 324, and 326 (which are each linked to first LBR DAG root instance 355-1). The consensus state information for second LBR DAG root instance 355-2 can be based on the local knowledge determined and shared by sentinel nodes 324, 326, and 328 (which are each linked to second LBR DAG root instance 355-2). If the link between a sentinel and a DAG root instance is down or unavailable, the sentinel can share this message in its local knowledge synchronization to the remainder of the sentinel layer 320, as a link going down or being unavailable can be treated as a potential indication of a failure of the DAG root instance at the end of the link.

In some aspects, a first consensus determination can be reached to decide the current state and/or status of each LBR within the virtual DODAG root 350. The first consensus determination can be indicative of an up/down status for each LBR 355-1, 355-2; can be indicative of a current traffic load for each LBR 355-1, 355-2; can be indicative of a current status or adherence to respective SLA requirements for each LBR 355-1, 355-2; and/or can be indicative of a current functionality performance level for each LBR 355-1, 355-2; etc.

Based on the first consensus determination of the current state or status of the LBRs within virtual DODAG root 350, the sentinels 320 may perform an additional consensus determination to select which LBR (of those that are consensus-determined to be currently active) will be used as the active DAG root of the virtual DODAG root. This additional consensus determination can also be referred to as an election (e.g., LBR election) for the virtual DODAG root 350.

For instance, if LBR 355-1 is the currently active DAG root instance and LBR 355-2 is held as a hot standby (e.g., not currently used as an active DAG root instance), and the first consensus determination indicates that LBR 355-1 has crashed or otherwise failed, then the plurality of sentinel nodes 320 can perform the LBR election to trigger fallback to the hot standby LBR, which in this example is LBR 355-2. In particular, the hot standby LBR 355-2 is transitioned to the currently active DAG root instance for virtual DODAG root 350. The sentinels 320 do not advertise this change or fallback downward to any of the non-LBR nodes 310, but instead continues to advertise the single virtual rank value that the sentinels 320 have previously instantiated for the virtual DODAG root 350. However, traffic routed upward from a non-LBR node 310 to one of the sentinel nodes 322-328 that is destined for the virtual rank corresponding to virtual DODAG root 350 will now be routed (e.g., tunneled) from the sentinel layer 320 to the second LBR DAG root instance 355-2 (i.e., instead of to the first LBR DAG root instance 355-1, as it would have been routed prior to the hot standby fallback described in the example above).

The sentinels 320 can implement the consensus message passing mechanism for local synchronization based on the fact that some sentinels may see reliable information of the current state of their connected LBR(s), while other sentinels may see unreliable information (or have no information) of the current state of their connected LBR(s). Accordingly, the sentinels 320 perform periodic message passing amongst themselves to determine a consensus (e.g., majority or otherwise) view of the current state of all of the LBRs 355-1, 355-2, etc. in the virtual DODAG root 350. The message passing can be performed out-of-band (i.e., not using the DODAG topology 300). In some embodiments, one or more LBRs (e.g., LBR 355-1, 355-2) of virtual DODAG root 350 can also participate in the message passing between sentinels 320 that is used to establish the consensus. Based on the most recent consensus information, all of the sentinel nodes 320 will route traffic from the lower nodes 310 to appropriate LBRs 355-1 and/or 355-2 within the virtual DODAG root 350.

The same consensus message passing mechanism amongst the sentinels 320 can also be used to perform load balancing, wherein the sentinels 320 perform message passing amongst one another to determine the current ability of their connected LBR(s) 355-1, 355-2, etc. to meet SLA requirements of the remaining nodes. For instance, the sentinels 320 can determine a consensus information indicative of the current message load of the LBRs 355-1, 355-2, etc., in the virtual DODAG root 350—if the LBR 355-1 has a load of 95% and the LBR 355-2 has a load of 10%, the sentinels 320 can begin routing more traffic (e.g., from the lower nodes 310) to the LBR 355-2 of the virtual DODAG root 350, until the SLA requirements are met or exceeded (and/or until the traffic is balanced as desired, according to one or more load balancing objectives, criteria, etc.).

As noted previously, an important functionality of the plurality of sentinel nodes 320 is the advertisement of the virtual DODAG root 350 by the sentinels 320 to the remaining nodes 310 of the DODAG topology 300. The sentinels 320 advertise a virtual DODAG root 350 that appears to the remaining nodes 310 as if it were a single LBR DAG root instance, masking the fact that there are multiple LBR DAG root instances 355-1 and 355-2. To do so, the sentinels 320 instantiate a virtual rank corresponding to the virtual DODAG root 350, and advertise the virtual rank down to the remaining nodes 310. In this manner, the churn between the sentinels 320 and the effective LBR roots 355-1, 355-2 (i.e., within the virtual DODAG root 350) being used at any given moment in time is hidden from the routers below.

For instance, if the LBR 355-1 in the figure above is instantiated with a rank of "1" and the LBR 355-2 is instantiated with a rank of "2", the virtual DODAG root 350 is instantiated and advertised to the remaining nodes 310 with a virtual rank of "0", while the LBR 355-1 rank "1" and LBR 355-2 rank "2" are not advertised. In this manner, the remaining nodes 310 always see that they are routing traffic to or from the rank "0" DODAG root, which is the virtual DODAG root 350—when in fact, the nodes 310 may be interchangeably or alternating communicating using either the rank "1" or the rank "2" LBR 355-1, 355-2 respectively, of the virtual DODAG root 350.

FIG. 4 illustrates a flowchart of an example process 400 for providing a virtual DODAG root for hot standby in an LLN and/or RPL-based network. For instance, the process 400 can be used to implement hot standby using a virtual DODAG root in a Wi-SUN network. In some aspects, the process 400 can be implemented as an IoT Hot Standby Router Protocol (HSRP) and/or Virtual Router Protocol (VRP) controlled based on a plurality of sentinel nodes within the DODAG.

However, it is also understood that example process 400 of FIG. 4 and/or various other processes described herein can also be implemented using one or more processors and memories having computer-readable instructions stored thereon, which when executed by the one or more processors cause the one or more processors to perform operations including some or all of process 400. Although process 400 depicts a particular sequence of operations, the sequence may be altered without departing from the scope of the present disclosure. For example, some of the operations depicted may be performed in parallel or in a different sequence that does not materially affect the function of process 400. In other examples, different components of an example device or system that implements process 400 may perform functions at substantially the same time or in a specific sequence.

At block 402, the process 400 includes determining respective link state information corresponding to each link of a plurality of links between two or more border routers and a plurality of child nodes of the two or more border routers, wherein the two or more border routers and the plurality of child nodes are included in a Destination Oriented Directed Acyclic Graph (DODAG) of a Low-Power Lossy Network (LLN).

For instance, the plurality of links can be links between two or more LBRs, such as the LBRs 355-1 and 355-2 of FIG. 3, and a plurality of child nodes that are the same as or similar to the plurality of sentinel nodes 320. In some embodiments, the two or more border routers are the same as the LBRs included in virtual DODAG root 350 of FIG. 3. In some examples, the plurality of child nodes of the border routers are sentinel nodes that may be the same as or similar to the sentinel nodes 322-328 and/or other sentinel nodes of the plurality of sentinel nodes 320 of FIG. 3. The DODAG of the LLN can be the same as or similar to the DODAG topology 300 of FIG. 3.

In some cases, the two or more border routers are LLN border routers (LBRs), each LBR configured as a root node of the DODAG and linked to one or more of the plurality of child nodes. In some aspects, the virtual DODAG root comprises the two or more LBRs. In examples where the plurality of child nodes comprises a plurality of sentinel nodes of the DODAG, each sentinel node of the plurality of sentinel nodes can be configured to monitor a DODAG root status based on synchronization of respective local information determined by each sentinel node.

At block 404, the process 400 includes determining consensus information indicative of a current status of each border router of the two or more border routers, wherein the consensus information is based on the respective link state information. For instance, the consensus information can be determined by the plurality of sentinel nodes 320, and can be indicative of a current status of each LBR 355-1, 355-2, etc., included in the virtual DODAG root 350 of FIG. 3

In some aspects, the sentinel nodes 320 of FIG. 3 can monitor a DODAG root status corresponding to virtual DODAG root 350 by synchronizing respective local information determined by each of the sentinel nodes 322-328, using the consensus message passing mechanism. In some cases, determining the respective link state information comprises determining the respective local information by each sentinel node, and the synchronization of the respective local information determined by each sentinel node is based on consensus message passing between the plurality of sentinel nodes.

In some embodiments, the consensus information can be indicative of a failure of one or more LBRs included or within a virtual DODAG root (e.g., such as LBRs 355-1, 355-2 of FIG. 3). In some cases, the consensus information can additionally, or alternatively, be indicative of a degraded performance or functionality of one or more LBRs of the virtual DODAG root. In some examples, the consensus information can additionally, or alternatively, be indicative of the current ability of an LBR of the virtual DODAG root to meet one or more SLA requirements for the attached nodes. The consensus information may additionally, or alternatively, be indicative of current traffic load information corresponding to each respective LBR of the virtual DODAG root. For example, the consensus information can be indicative of a consensus current traffic load determined for each respective LBR of the two or more LBRs within the virtual DODAG root. In another example, the consensus information can be indicative of a failure of at least one active border router included in the virtual DODAG root, and wherein the consensus information is determined based on message passing between the plurality of sentinel nodes of the respective local information.

At block 406, the process 400 includes updating an election of one or more active border routers from the two or more border routers to utilize as a virtual DODAG root for the LLN. For instance, updating the election of active border routers can be performed based on the consensus information from the sentinel nodes. In some embodiments, the process 400 further includes instantiating a virtual rank corresponding to the virtual DODAG root, wherein the virtual rank is different from a respective rank corresponding to each LBR of the two or more LBRs. For instance, the virtual rank of the virtual DODAG root can be instantiated by the plurality of sentinel nodes 320 of FIG. 3.

The plurality of sentinel nodes (e.g., the plurality of child nodes) can be configured to advertise the virtual rank of the virtual DODAG root to a plurality of additional nodes of the DODAG, without advertising the respective rank corresponding to each LBR of the two or more LBRs. The plurality of additional nodes can be non-LBR nodes, such as child nodes of the plurality of sentinel nodes. For instance, the plurality of additional nodes can be the same as or similar to the plurality of nodes 310 of FIG. 3.

At block 408, the process 400 includes routing traffic directed to the virtual DODAG root to an active border router of the two or more border routers based on the updated election. For instance, traffic directed to the virtual DODAG root 350 can be routed to an active LBR selected from the LBRs 355-1 or 355-2 within virtual DODAG root 350 of FIG. 3. In some examples, the updated election corresponds to identifying a first one of LBRs 355-1 or 355-2 is failed, and in response identifying the remaining one of LBRs 355-1 or 355-2 as the new active LBR for virtual DODAG root 350 of FIG. 3.

In some cases, the traffic directed to the virtual DODAG root is received from an additional node that is below the plurality of child nodes in the DODAG, and wherein the traffic is addressed to a virtual rank corresponding to the virtual DODAG root. In some examples, the process further includes reconfiguring, based on detecting the failure, a traffic routing pattern between the plurality of sentinel nodes and the virtual DODAG root. For instance, the traffic routing pattern can be updated to exclude the failed border router from the election of active border routers within the virtual DODAG root.

Figure 5:
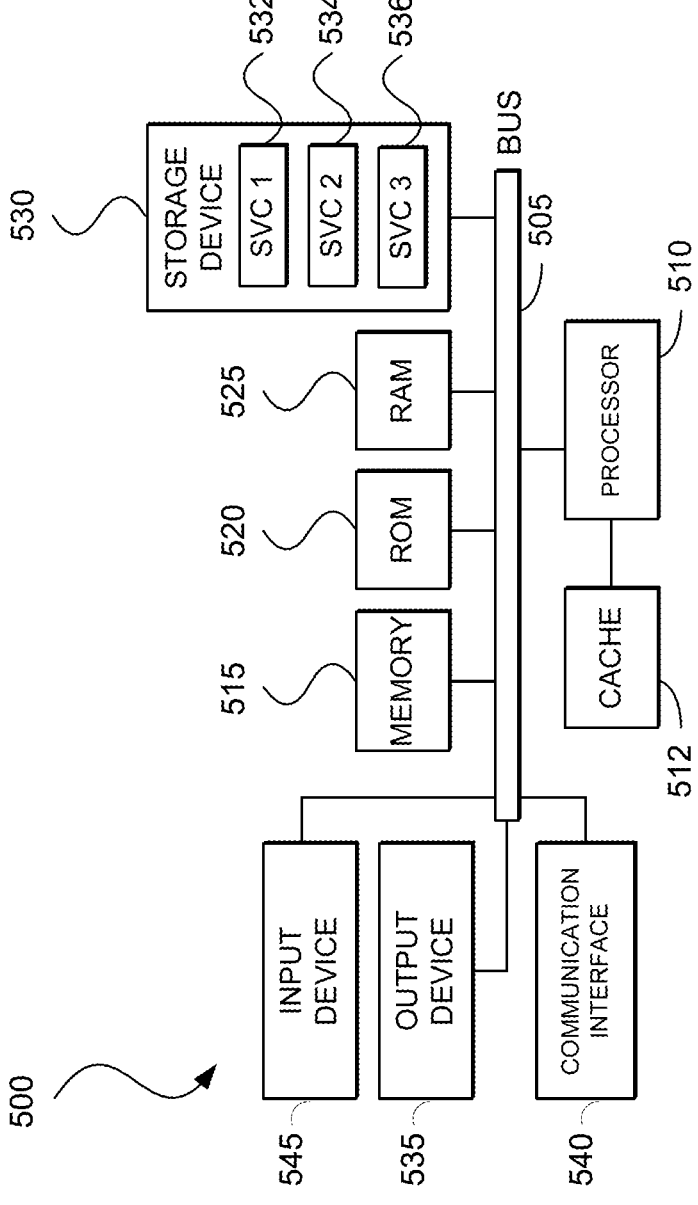
FIG. 5 is a block diagram illustrating an example of a computing system for implementing certain aspects described herein.

In some cases, the traffic routing pattern can be updated based on performing load balancing of traffic originating within the DODAG and addressed to the virtual DODAG root, wherein the load balancing is based on the consensus current traffic load determined for the two or more LBRs within the virtual DODAG root. For instance, a first portion of the traffic addressed to the virtual DODAG root can be tunneled from a sentinel node of the plurality of sentinel nodes to a first LBR within the virtual DODAG root. A second portion of the traffic addressed to the virtual DODAG root can be tunneled from a sentinel node of the plurality of sentinel nodes to a second LBR within the virtual DODAG root FIG. 5 illustrates a computing system architecture, according to some aspects of the present disclosure. Components of computing system architecture 500 are in electrical communication with each other using a connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method comprising:
determining respective link state information corresponding to each link of a plurality of links between two or more border routers and a plurality of child nodes of the two or more border routers, wherein the two or more border routers and the plurality of child nodes are included in a Destination Oriented Directed Acyclic Graph (DODAG) of a Low-Power Lossy Network (LLN);
instantiating a virtual rank corresponding to a virtual DODAG root, wherein the virtual rank is different from a respective rank corresponding to each border router of the two or more border routers; and
advertising, by the plurality of child nodes, the virtual rank of the virtual DODAG root to a plurality of additional nodes of the DODAG, without advertising the respective rank corresponding to each border router of the two or more border routers:
determining consensus information indicative of a current status of each border router of the two or more border routers, wherein the consensus information is based on the respective link state information;

based on the consensus information, updating an election of one or more active border routers from the two or more border routers to utilize as the virtual DODAG root for the LLN; and
routing traffic directed to the virtual DODAG root to an active border router of the two or more border routers based on the updated election.

2. The method of claim 1, wherein:
the two or more border routers are LLN border routers (LBRs), each LBR configured as a root node of the DODAG and linked to one or more of the plurality of child nodes; and
the virtual DODAG root comprises the two or more LBRs.

3. The method of claim 1, wherein the traffic directed to the virtual DODAG root is received from an additional node that is below the plurality of child nodes in the DODAG, and wherein the traffic is addressed to a virtual rank corresponding to the virtual DODAG root.

4. The method of claim 1, wherein:
the plurality of child nodes comprises a plurality of sentinel nodes of the DODAG; and
each sentinel node of the plurality of sentinel nodes is configured to monitor a DODAG root status based on synchronization of respective local information determined by each sentinel node.

5. The method of claim 4, wherein:
determining the respective link state information comprises determining the respective local information by each sentinel node; and
the synchronization of the respective local information determined by each sentinel node is based on consensus message passing between the plurality of sentinel nodes.

6. The method of claim 4, wherein the consensus information is indicative of a failure of at least one active border router included in the virtual DODAG root, and wherein the consensus information is determined based on message passing between the plurality of sentinel nodes of the respective local information.

7. The method of claim 6, further comprising reconfiguring, based on detecting the failure, a traffic routing pattern between the plurality of sentinel nodes and the virtual DODAG root.

8. The method of claim 7, wherein the traffic routing pattern is updated to exclude the failed border router from the election of active border routers within the virtual DODAG root.

9. The method of claim 1, wherein:
the two or more border routers comprise two or more LBRs within the virtual DODAG root, and wherein the plurality of child nodes comprises a plurality of sentinel nodes of the DODAG; and
the consensus information is indicative of a consensus current traffic load determined for each respective LBR of the two or more LBRs within the virtual DODAG root.

10. The method of claim 9, further comprising performing load balancing of traffic originating within the DODAG and addressed to the virtual DODAG root, wherein the load balancing is based on the consensus current traffic load determined for the two or more LBRs within the virtual DODAG root.

11. The method of claim 10, wherein:

a first portion of the traffic addressed to the virtual DODAG root is tunneled from a sentinel node of the plurality of sentinel nodes to a first LBR within the virtual DODAG root; and a second portion of the traffic addressed to the virtual DODAG root is tunneled from a sentinel node of the plurality of sentinel nodes to a second LBR within the virtual DODAG root.

12. A system comprising:

one or more processors; and one or more computer-readable storage media having computer-readable instructions stored thereon, wherein the computer-readable instructions, when executed by the one or more processors, cause the one or more processors to:

determine respective link state information corresponding to each link of a plurality of links between two or more border routers and a plurality of child nodes of the two or more border routers, wherein the two or more border routers and the plurality of child nodes are included in a Destination Oriented Directed Acyclic Graph (DODAG) of a Low-Power Lossy Network (LLN);

instantiate a virtual rank corresponding to a virtual DODAG root, wherein the virtual rank is different from a respective rank corresponding to each border router of the two or more border routers; and advertise, by the plurality of child nodes, the virtual rank of the virtual DODAG root to a plurality of additional nodes of the DODAG, without advertising the respective rank corresponding to each border router of the two or more border routers:

determine consensus information indicative of a current status of each border router of the two or more border routers, wherein the consensus information is based on the respective link state information;

based on the consensus information, update an election of one or more active border routers from the two or more border routers to utilize as the virtual DODAG root for the LLN; and route traffic directed to the virtual DODAG root to an active border router of the two or more border routers based on the updated election.

13. The system of claim 12, wherein the two or more border routers are LLN border routers (LBRs) included within the virtual DODAG root, each LBR configured as a root node of the DODAG and linked to one or more of the plurality of child nodes.

14. The system of claim 12, wherein:

the plurality of child nodes comprises a plurality of sentinel nodes of the DODAG; and each sentinel node of the plurality of sentinel nodes is configured to monitor a DODAG root status based on synchronization of respective local information determined by each sentinel node.

15. The system of claim 13, wherein the consensus information is indicative of a failure of at least one active border router included in the virtual DODAG root, and wherein the consensus information is determined based on message passing between the plurality of sentinel nodes of the respective local information.

16. The system of claim 15, wherein the computer-readable instructions cause the one or more processors to:

reconfigure a traffic routing pattern between the plurality of sentinel nodes and the virtual DODAG root based on detecting the failure, wherein the traffic routing pattern is updated to exclude the failed border router from the election of active border routers within the virtual DODAG root.

17. The system of claim 16, wherein the computer-readable instructions further cause the one or more processors to:

perform load balancing of traffic originating within the DODAG and addressed to the virtual DODAG root, based on a consensus current traffic load determined for the two or more LBRs within the virtual DODAG root using a plurality of sentinel nodes of the DODAG.

18. The system of claim 17, wherein:

a first portion of the traffic addressed to the virtual DODAG root is tunneled from a sentinel node of the plurality of sentinel nodes to a first LBR within the virtual DODAG root; and a second portion of the traffic addressed to the virtual DODAG root is tunneled from a sentinel node of the plurality of sentinel nodes to a second LBR within the virtual DODAG root.

19. One or more non-transitory computer-readable media comprising computer-readable instructions, which when executed by one or more processors, cause the one or more processors to:

determine respective link state information corresponding to each link of a plurality of links between two or more border routers and a plurality of child nodes of the two or more border routers, wherein the two or more border routers and the plurality of child nodes are included in a Destination Oriented Directed Acyclic Graph (DODAG) of a Low-Power Lossy Network (LLN);

instantiate a virtual rank corresponding to a virtual DODAG root, wherein the virtual rank is different from a respective rank corresponding to each border router of the two or more border routers: and advertise, by the plurality of child nodes, the virtual rank of the virtual DODAG root to a plurality of additional nodes of the DODAG, without advertising the respective rank corresponding to each border router of the two or more border routers;

determine consensus information indicative of a current status of each border router of the two or more border routers, wherein the consensus information is based on the respective link state information;

based on the consensus information, update an election of one or more active border routers from the two or more border routers to utilize as the virtual DODAG root for the LLN; and route traffic directed to the virtual DODAG root to an active border router of the two or more border routers based on the updated election.

20. The one or more non-transitory computer-readable media of claim 19, wherein:

a first portion of the traffic addressed to the virtual DODAG root is tunneled from a sentinel node of the plurality of sentinel nodes to a first LNN Border Router LBR within the virtual DODAG root; and a second portion of the traffic addressed to the virtual DODAG root is tunneled from a sentinel node of the plurality of sentinel nodes to a second LBR within the virtual DODAG root.

* * * * *